(12) United States Patent
Rossi

(10) Patent No.: US 6,740,844 B2
(45) Date of Patent: May 25, 2004

(54) TOOL-HOLDER HEAD, IN PARTICULAR FOR PLASMA BEAM CUTTING MACHINES

(75) Inventor: Marcello Rossi, Pontassieve (IT)

(73) Assignee: CR Electronic S.R.L., Pontassieve (IT)

( * ) Notice: Subject to any disclaimer, the term of this patent is extended or adjusted under 35 U.S.C. 154(b) by 0 days.

(21) Appl. No.: 09/782,861

(22) Filed: Feb. 14, 2001

(65) Prior Publication Data

US 2003/0116540 A1 Jun. 26, 2003

(51) Int. Cl.⁷ .............................................. B23K 10/00
(52) U.S. Cl. ............................ 219/121.59; 219/121.39; 219/121.48; 219/121.82
(58) Field of Search ........................ 219/121.83, 121.39, 219/121.44, 121.59, 121.48, 121.58, 121.67, 121.82; 33/503; 248/206.5; 266/69–77

(56) References Cited

U.S. PATENT DOCUMENTS 4,356,043 A * 10/1982 Anderson et al. ............. 266/69
5,525,777 A * 6/1996 Kukuljan ................ 219/121.83
6,519,860 B1 * 2/2003 Bieg et al. ..................... 33/503

* cited by examiner

Primary Examiner—Mark H. Paschall
(74) Attorney, Agent, or Firm—Harrison & Egbert

(57) ABSTRACT

A tool-holder head for machines using radiant energy beams, that is suitable in particular for plasma beam cutting machines, includes a vertical sliding saddle to which at least an energy beam source is constrained through an articulated support that secures the position of normal use of the source and allows the source to move according to the vertical axis or to translate according to the working position when transversal or axial forces are applied to the source's terminal part. The tool-holder bead is also equipped with a sensing system of the above-said movings and translations so to be able to operate on the control of the machine with the more suitable proceedings according to the operating condition consequent to the senses.

7 Claims, 2 Drawing Sheets

TOOL-HOLDER HEAD, IN PARTICULAR FOR PLASMA BEAM CUTTING MACHINES

BACKGROUND OF THE INVENTION

1. Field of the Invention

This invention concerns a tool-holder head for machines using radiant energy beams, especially suitable for plasma beam cutting machines.

As known, the machines using radiant energy beams have more and more growing use in the carrying out of several working processes, such as the engraving process through applying a laser beam on flat surfaces of different material, or the cutting process through applying a plasma beam on plates having a certain thickness, according to determinate shaped profiles.

2. Description of Related Art

The machine tools used in these processes are equipped with turrets or tool-holder heads in which the photonic probes, the cutting torches or the used energy beam sources are supported in a vertical position and they can be translated in parallel to themselves staying at a fixed distance from the flat surface of the workpiece.

As it is for other tool-holder heads having a vertical axis, also in these machines the "tool" can be lift up and lowered according to the working surface through drives included in the head itself, while the horizontal advancements take place through movements of the turret according to "x" and "y" directions.

So, in these machines, the "tool" is constrained to the tool-holder head in such a way so as to move only according to translations towards the "z" axis or, towards the head axis.

The energy beam source is rigidly constrained to the respective supporting head and it is controlled to slide only according to the head axis direction, i.e. orthogonally to the working surface, or in a tilted direction when, as in some machines, the head can work in a tilted way according to the vertical position.

The distance of the energy beam source's lower end from the workpiece surface must have a fixed and a constant value during all the working, especially during workings using plasma beams, where, as known, the necessary power and the energy to the holding of the electric arc on which the beam is based are strictly proportional to the arc's length.

In this case, to obtain an high efficiency of the carried out working process, the above-said distance must be kept constant with predetermined low values.

Consequently, as it is easy to understand, some problems arise due to the irregularity of the surface, to the kind of the material to be worked, to unexpected objects during the cutting run or to other events which can cause the plasma beam source's terminal part, commonly called cutting torch, to collide against unexpected obstacles and damage itself, in an irreparable way too.

BRIEF SUMMARY OF THE INVENTION

The main aim of this invention is to propose an innovative tool-holder head, through which it can be possible to nullify the risks of damage of the cutting torch in case of impacts or collisions.

Another aim of the invention is to propose an embodiment that enables the easy use of the energy beam machines, allowing a rapid and effective calibration of the zero rate according to the "z" axis with no metallic materials too.

A further aim is to propose an embodiment easily suitable to the machine tools currently in use.

These and other aims which will become clear in the following description are achieved through a tool-holder head for machines using radiant energy beams including a vertical sliding saddle to which an energy beam source is constrained through an articulated support that is held through elastic means in the embodiment in which said energy beam source is in the position of normal working and which can furthermore allow said radiant energy source to have, respectively, either tilted positions according to the axis of normal working or translated positions according to said position of normal use, respectively when upwards transversal or axial forces are applied to the lower terminal part of said energy beam source.

The tool-holder head also includes sensors fit for sensing the corresponding movements of said energy beam source according to said normal working position, said sensors are connected to the machine control unit, so as to select, according to the kind of sensed movement, the exact step, such as the interruption of working process, or a simple calibration of the working parameters.

Unlike the tool-holder heads usually used in machines using radiant energy beams, there is a useless rigid connection between the head and the energy beam source, useless because said source, unlike the usual tools used in mechanical workings, during the working process is not subject to any transversal stress according to the advance movement, the tool-holder head of the invention has the new characteristic of allowing to the "tool" to tilt or to translate upwards, according to the corresponding supporting saddle, when any stress is applied to the terminal part of the same, avoiding any damaging due to impacts or collisions.

Furthermore, suitable sensors of the "tool" movements according to the normal working position, allow finding, quickly, anomalous conditions and operating on the control of the machine with the more suitable proceeding.

BRIEF DESCRIPTION OF THE SEVERAL VIEWS OF THE DRAWINGS

To allow a better comprehension of the constructive and functional characteristics of the proposed tool-holder head, a more detailed description of the invention is following as an example, together with the attached drawings.

DETAILED DESCRIPTION OF THE INVENTION

Figure 1:
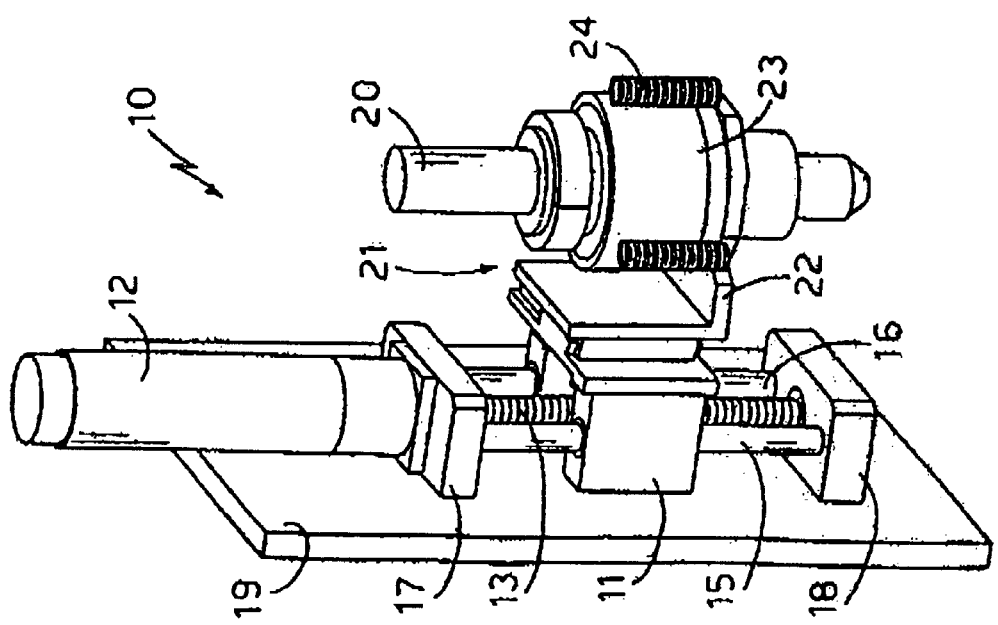
FIG. 1 shows a schematic prospective view of a tool-holder head according to the present invention.

With reference to FIG. 1, a tool-holder head for a plasma beam cutting machine is indicated with 10.

Figure 2:
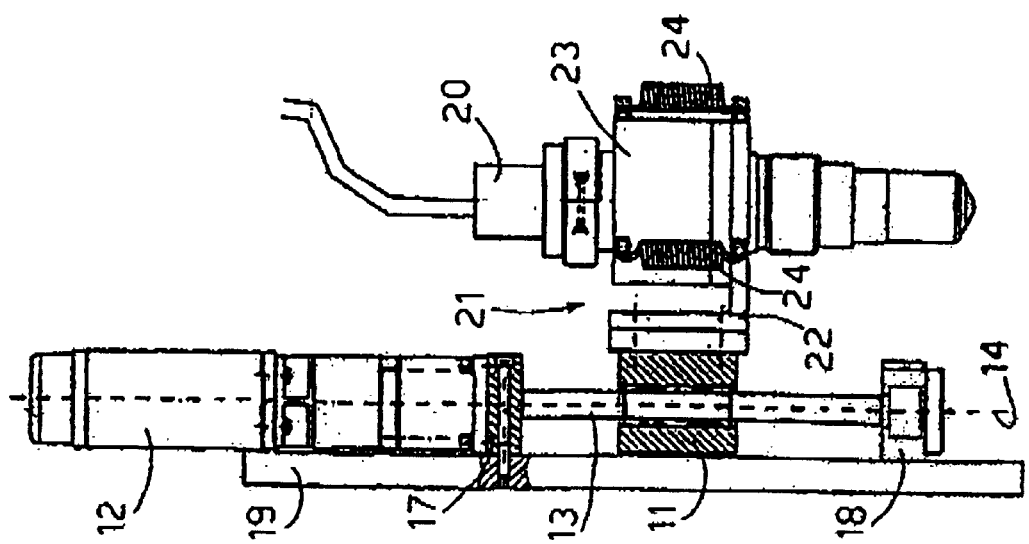
FIG. 2 shows a lateral view, in partial cross section, of the tool-holder head of FIG. 1.

It includes a saddle 11, operated by a motor 12, coaxial to the screw 13, with which said saddle engages itself, as it is clearly showed in FIG. 2, to be moved along the vertical axis 14. The lateral guides 15 and 16 assure the vertical sliding of said saddle between the two positions respectively determined by the upper supporting blocks 17 and lower 18, anchored to the face 19.

The radiant energy beam source 20, which in this embodiment is constituted by a cutting torch, is constrained to said saddle 11 through an articulated support 21, consisting of two principal portions 22 and 23, where the L-square shaped portion 22 is steadily anchored to the saddle 11, while the portion 23, housing in its center the cutting torch 20, is jointly constrained to the fixed portion 22, and is held in the working position as in the FIG. 2 through elastic means 24.

Figure 3:
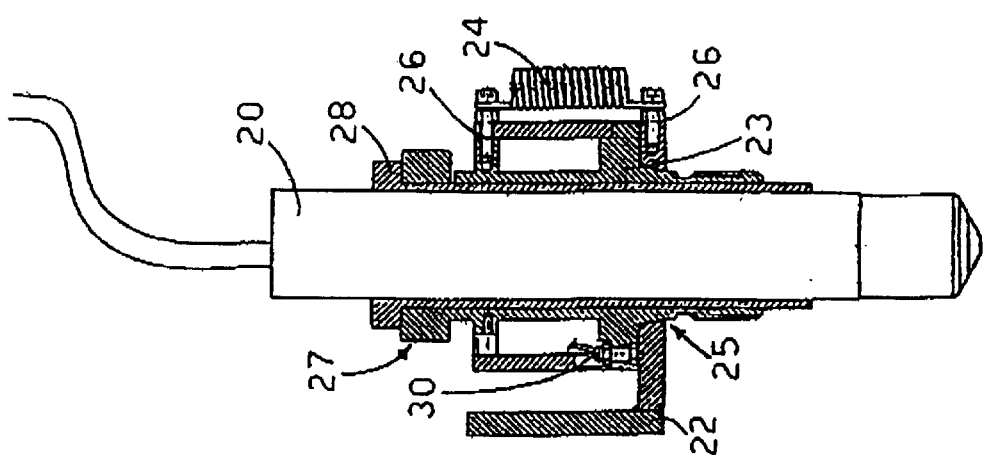
FIG. 3 shows a detailed cross sectional view of some parts of the tool-holder head according to the invention.

Exactly, as shown in FIG. 3, that the portion 23 of the articulated support 21 houses said source 20 in a circular opening 25 on the horizontal bracket of the L-square portion 22, said housing being suitable because of the truncated-cone shape of the edges of said circular opening 25 and of the same portion 23 in the contact area with the fixed portion 22.

As said before, in the embodiment showed in FIGS. 2 and 3, the two portions of the articulated support are held steadily in contact with each other through elastic means constituted by springs 24, uniformly distributed along the perimeter of the same support, said springs being anchored through screwing pivots 26 to the horizontal bracket of the fixed portion 22 and to the external superior rim of said portion 23.

In this case, the locking of the cub torch 20 to the movable portion 23 of the articulated support 21 is achieved through the locking ring 27, which is clamped to the insulating bush 28, to which the cutting torch is integral through a forced connection. The ring 27 is constituted by a fixed semi-part 27a, that is part of the body of the mobile portion 23 and by a free semi-part 27b which is returned back towards the fixed semi-part operating on suitable screw means 29, showed in FIG. 4.

Furthermore, with reference to the FIG. 3, in the portion 23 of the articulated support 21 and placed in correspondence to the contact surface with the fixed portion 22 there are closeness sensors 30, which, for their position that is well shown in said figure, are fit for sensing the condition between relative contact or no-contact of the articulated support's two portions.

This is useful for an effective control of the machine, because said sensors can be connected to the central control unit of the same machine directly or through electronic circuits of suitable interface.

The above described tool-holder head works according to the following proceeding steps.

Figure 4:
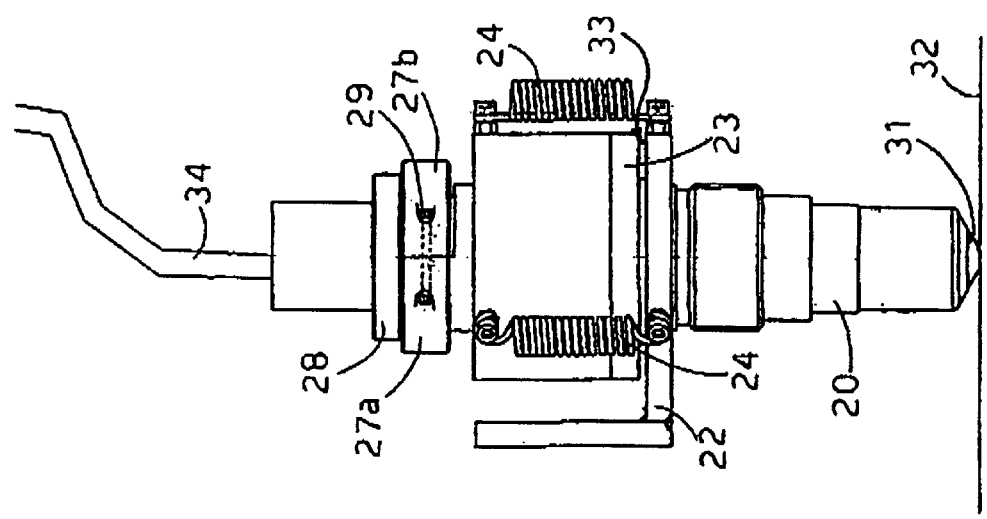
FIG. 4 shows a lateral view of the parts of FIG. 3 in a particular operating embodiment.

After the energy beam source 20 has been constrained to the articulated support 21 according to the embodiment of which in the FIG. 2, the saddle 11 of the tool-holder head is controlled to slide along the guides 15 and 16 until the terminal part 31 of the torch 20 contacts the plate 32, as showed in FIG. 4.

In this condition the portion 23 of the articulated support integral to the torch 20 lifts, overcoming the reaction of the elastic means 24, as showed in said figure, according to the portion 22, integral to the saddle 11 and of a portion 33, herein showed in an indicative way. The no-contact condition 33 between the two portions of the articulated support is sensed by all the closeness sensors 30, and it is transmitted to the control unit of the machine so as to determine the zero rate, along the "z" axis.

So, the energy beam source is brought, through the saddle 11, to the working height suitable for the kind of working to carry out and it is activated through the feed cable 34. Then the working process starts, in this case a cutting operation, through the movement of the tool-holder head towards the "x" and "y" directions according to a fixed run.

In this step the corresponding position of the two portions of the articulated support 21 shown in FIG. 3, the no-contact condition 33 has been nullified through the springs 24, during the positioning of the torch 20, at the right height of working.

Figure 5:
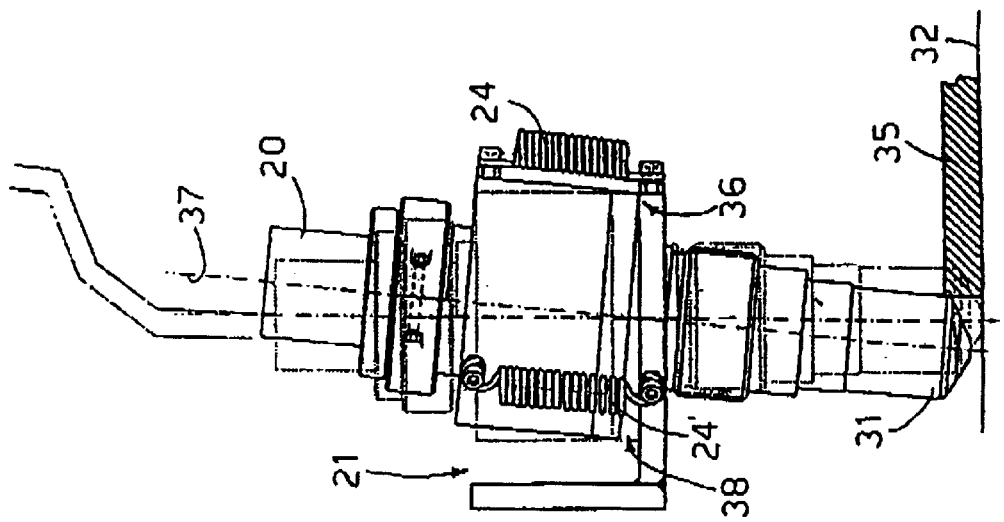
FIG. 5 shows a further lateral view of the parts of FIG. 3 in a different operating embodiment.

If, during the working, the terminal part 31 of the cutting torch 20 is subject to transversal forces, such as those resulting from the collision against obstacles 35, present on the surface to be worked 32, the portion 23 of the articulated support 21 places itself in a tilted position according to the portion 22. With reference to the condition showed in FIG. 5, the portion 23 can rotate around the point 36, which is the contact point with the fixed portion 22, overcoming the spring action 24, and changing from the normal working position, illustrated in section lining, to the tilted position according to the inclination axis 37, illustrated in full lining.

The following no-contact condition 38 which results between the two portions 22 and 23, by the side of the spring 24, is sensed only by the closeness sensors 30, placed in correspondence of said area. This condition is interpreted by the control unit of the machine as an anomalous condition, consequently the advancement of the cutting torch is interrupted, protecting its integrity.

The sense of above-said condition or of another condition of similar anomalous working can be carried out also through a suitable electronic circuit connected to the sensors 30, instead of the central control unit of the machine and said circuit can activate directly the emergency stop of the machine.

Other different embodiments or variations to all above-described can be proposed.

The constraint of the energy bean source to the articulated support can occur in a different way, by using, instead of the open ring 27, a special bush which engages itself into a suitable thread on the lower area of the portion 23, showed in the enclosed figures.

The elastic means that constrain each other and the two portions 22 and 23 of the articulated support 21 could be different from the springs 24, used in the illustrated example and could be placed in different positions.

The sensors could be placed, for example, integrally to the fixed portion 22, instead of to the moving portion 23.

Furthermore, the same sensors can be of the different kind, not electrical necessarily.

The constraining means of the fixed portion of the articulated support 21 to the saddle 11, can be simple screw means or self-locking shaped connections.

The invention can be suitable to every kind of machine using energy beam sources, for workings concerning metallic and not metallic materials.

These and other variations can be applied to the above illustrative description, protecting however the advantages of the proposed embodiment.

I claim:

1. A tool holder head apparatus for use with a radiant energy beam comprising:
   an energy beam source;
   a vertical slipping saddle having an articulated support, said energy beam source being constrained by said articulated support;
   an elastic means affixed to said articulated support, said elastic means for supporting said energy beam source in a normal working condition, said articulated support comprising:

a first portion being removably constrained to said saddle, said first portion having a circular opening;

a second portion housed within said circular opening, said second portion constraining said energy beam source, said second portion being held in contact with said first portion through said elastic means, said elastic means having terminal ends anchored respectively to said first portion and to said second portion, said second portion being tiltable about an axis of said circular opening and vertically translatable relative to said first portion respectively by transversal forces and axial forces applied to said energy beam source and said second portion.

2. The apparatus of claim 1, further comprising:

sensor means connected to said saddle for sensing movements of said energy beam source relative to said saddle.

3. The apparatus of claim 2, said sensor means comprising:

closeness sensors positioned in said second portion of said articulated support in correspondence to a contact area between said first portion and said second portion, said sensor means for sensing a contact condition or a no-contact condition two said first portion and said second portion of said articulated support.

4. The apparatus of claim 3, said sensors being spaced uniformly in said contact area such that a vertical translation condition of said second portion relative to said first portion consequent to an axial force applied to a terminal end of said energy beam source is sensed simultaneously by all of said sensors by sensing the respective no-contact condition, a tilting condition of said second portion being sensed by the no-contact condition of only a few of said sensors.

5. The apparatus of claim 4, further comprising:

a control means for controlling a head advancement or an operating condition, said sensors being connected to said control means for stopping the head advancement or the operating condition when said tilting condition is sensed.

6. The apparatus of claim 5, said sensors being connected to said control means for obtaining a working height calibration of said energy beam source when said vertical translation condition of said second portion is sensed.

7. The apparatus of claim 1, said energy beam source being a plasma beam of a cutting machine.

* * * * *